US009179364B2

(12) United States Patent
Ramkumar et al.

(10) Patent No.: US 9,179,364 B2
(45) Date of Patent: Nov. 3, 2015

(54) METHOD AND APPARATUS FOR EXCLUDING GUARANTEED BIT RATE TRAFFIC BEARERS FROM LTE UL FLOW CONTROL

(71) Applicant: QUALCOMM Incorporated, San Diego, CA (US)

(72) Inventors: Vasanth Kumar Ramkumar, San Diego, CA (US); Navid Ehsan, San Diego, CA (US); Praveen N Kona, Hyderabad (IN); Srinivasan Rajagopalan, San Diego, CA (US); Bao Vinh Nguyen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 110 days.

(21) Appl. No.: 13/789,256

(22) Filed: Mar. 7, 2013

(65) Prior Publication Data
US 2013/0322331 A1    Dec. 5, 2013

Related U.S. Application Data

(60) Provisional application No. 61/653,318, filed on May 30, 2012.

(51) Int. Cl.
*H04W 4/00* (2009.01)
*H04W 28/10* (2009.01)
*H04L 12/851* (2013.01)
*H04L 12/853* (2013.01)
*H04W 28/06* (2009.01)
*H04W 72/04* (2009.01)

(52) U.S. Cl.
CPC ............ *H04W 28/10* (2013.01); *H04L 47/2416* (2013.01); *H04L 47/2483* (2013.01); *H04W 28/06* (2013.01); *H04W 72/04* (2013.01)

(58) Field of Classification Search
None
See application file for complete search history.

(56) References Cited

U.S. PATENT DOCUMENTS

| 8,165,152 | B2 | 4/2012 | Sammour et al. | |
|---|---|---|---|---|
| 2004/0110499 | A1* | 6/2004 | Kang et al. | 455/422.1 |
| 2006/0187846 | A1* | 8/2006 | Pelletier et al. | 370/252 |
| 2007/0224951 | A1* | 9/2007 | Gilb et al. | 455/127.5 |
| 2008/0046132 | A1* | 2/2008 | Dalsgaard et al. | 700/299 |

(Continued)

FOREIGN PATENT DOCUMENTS

| EP | 1691513 A1 | 8/2006 |
|---|---|---|
| EP | 2244514 A1 | 10/2010 |

OTHER PUBLICATIONS

International Search Report and Written Opinion—PCT/US2013/042598—ISA/EPO—Sep. 2, 2013.

(Continued)

*Primary Examiner* — Edan Orgad
*Assistant Examiner* — Rebecca Song
(74) *Attorney, Agent, or Firm* — Arent Fox LLP

(57) ABSTRACT

A method, an apparatus, and a computer program product for wireless communication are provided. The apparatus is a UE. The UE transmits data packets. The UE determines to implement a flow control to reduce a transmission rate of the data packets. The UE determines whether the data packets include known or potential real-time data packets. The UE refrains from implementing the flow control to reduce the transmission rate of the known/potential real-time data packets when the data packets include known/potential real-time data packets.

37 Claims, 11 Drawing Sheets

(56) References Cited

U.S. PATENT DOCUMENTS

| | | | |
|---|---|---|---|
| 2008/0279140 A1* | 11/2008 | Gaur | H04W 72/02 370/329 |
| 2009/0161545 A1 | 6/2009 | Ho et al. | |
| 2010/0309788 A1* | 12/2010 | Ho et al. | 370/236 |
| 2011/0194502 A1* | 8/2011 | Sung et al. | 370/329 |
| 2011/0199998 A1* | 8/2011 | Yi et al. | 370/329 |
| 2011/0312283 A1* | 12/2011 | Rodbro et al. | 455/68 |
| 2012/0069805 A1 | 3/2012 | Feuersanger et al. | |
| 2012/0092992 A1 | 4/2012 | Pappas et al. | |
| 2012/0178487 A1* | 7/2012 | Schmidtke et al. | 455/517 |
| 2012/0275391 A1* | 11/2012 | Cui et al. | 370/329 |
| 2012/0281536 A1 | 11/2012 | Gell et al. | |
| 2014/0023010 A1* | 1/2014 | Loehr et al. | 370/329 |

OTHER PUBLICATIONS

Panasonic et al., "SR Prohibit Mechanism for URL SPS", 3GPP Draft; R2-097400, 3rd Generation Partnership Project (3GPP), Mobile Competence Centre; 650, Route Des Lucioles; F-06921 Sophia-Antipolis Cedex; France, No. Jeju; 20091109, Nov. 9, 2009, XP050391530.

* cited by examiner

METHOD AND APPARATUS FOR EXCLUDING GUARANTEED BIT RATE TRAFFIC BEARERS FROM LTE UL FLOW CONTROL

CROSS-REFERENCE TO RELATED APPLICATION(S)

This application claims the benefit of U.S. Provisional Application Ser. No. 61/653,318, entitled "METHOD AND APPARATUS FOR EXCLUDING GUARANTEED BIT RATE TRAFFIC BEARERS FROM LTE UL FLOW CONTROL" and filed on May 30, 2012, which is expressly incorporated by reference herein in its entirety.

BACKGROUND

1. Field

The present disclosure relates generally to communication systems, and more particularly, to a method and apparatus for excluding guaranteed bit rate traffic bearers from Long Term Evolution (LTE) uplink (UL) flow control.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is LTE. LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the UL, and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus, which is a user equipment, transmits data packets. The apparatus determines to implement a flow control to reduce a transmission rate of the data packets. The apparatus determines whether the data packets include known or potential real-time data packets. The apparatus refrains from implementing the flow control to reduce the transmission rate of the known/potential real-time data packets when the data packets include known/potential real-time data packets.

DETAILED DESCRIPTION

Figure 1:
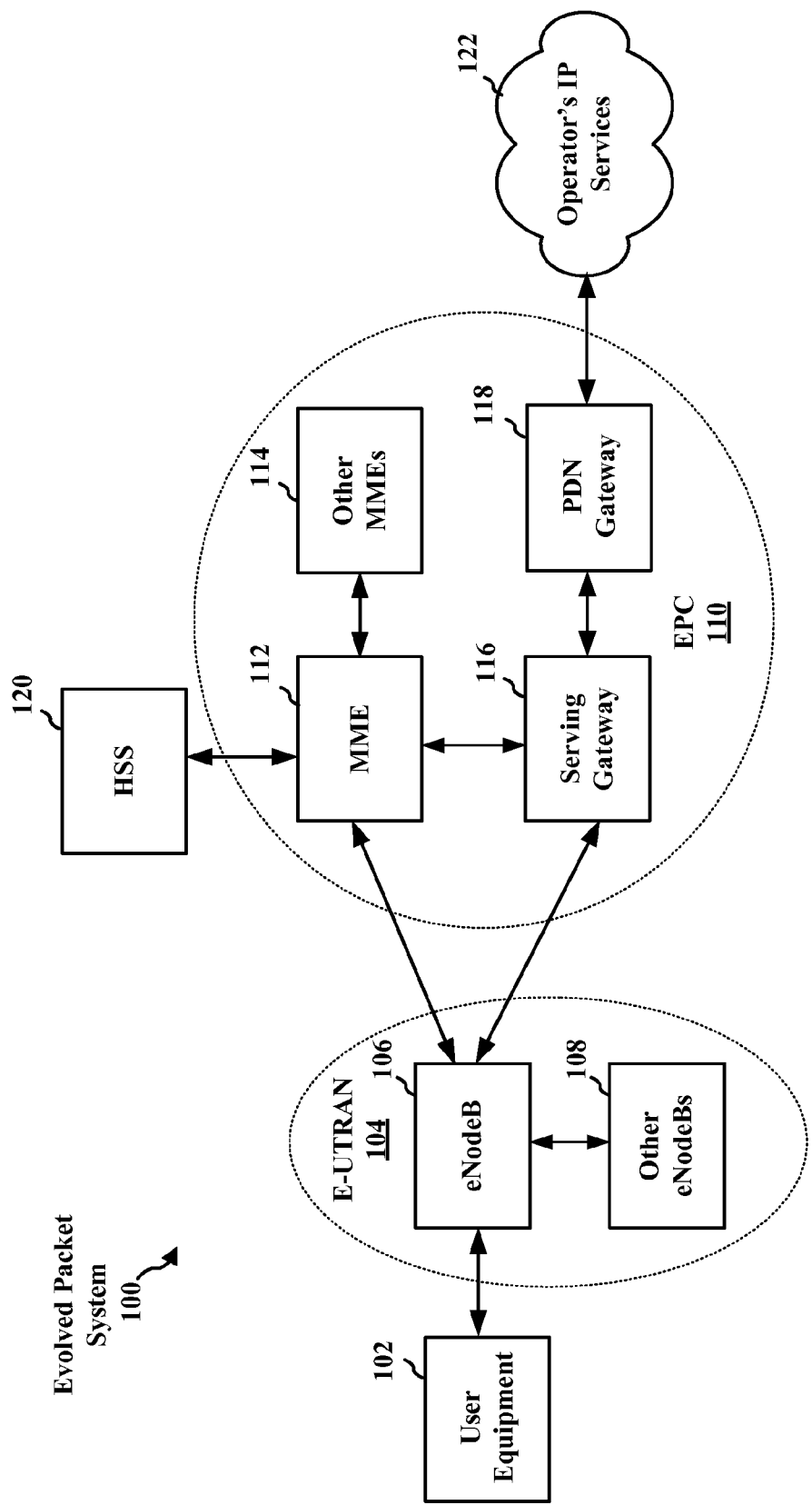
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
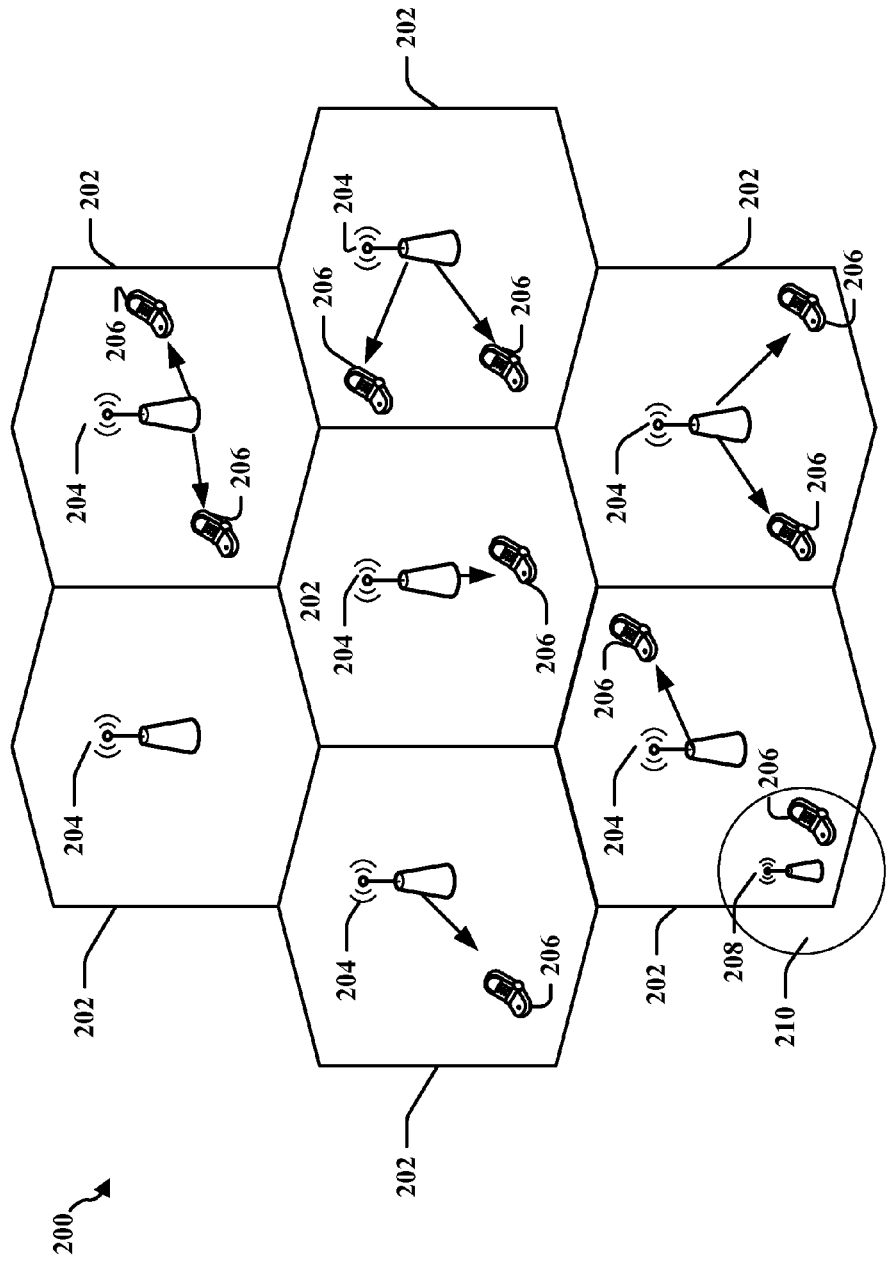
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
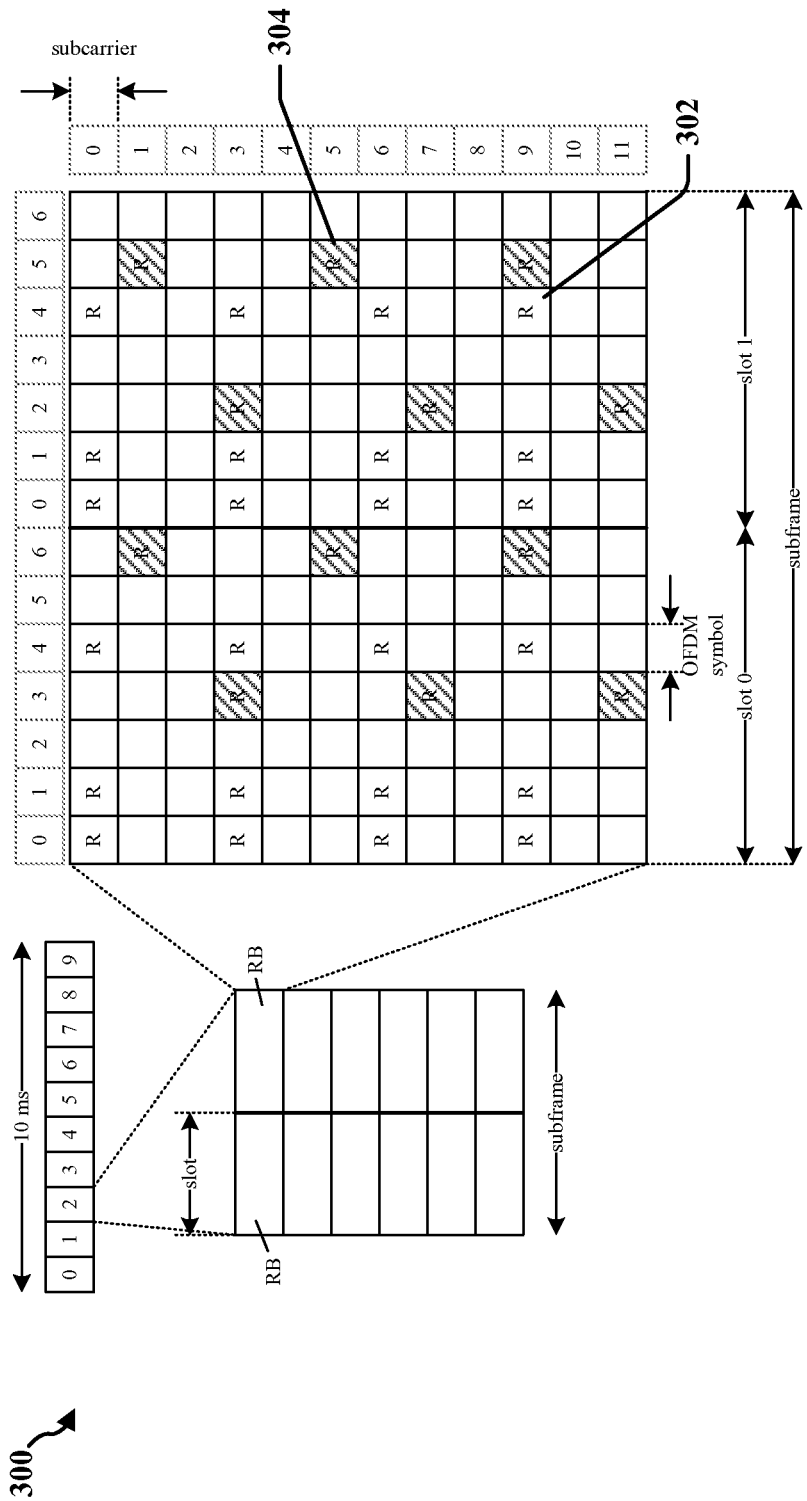
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
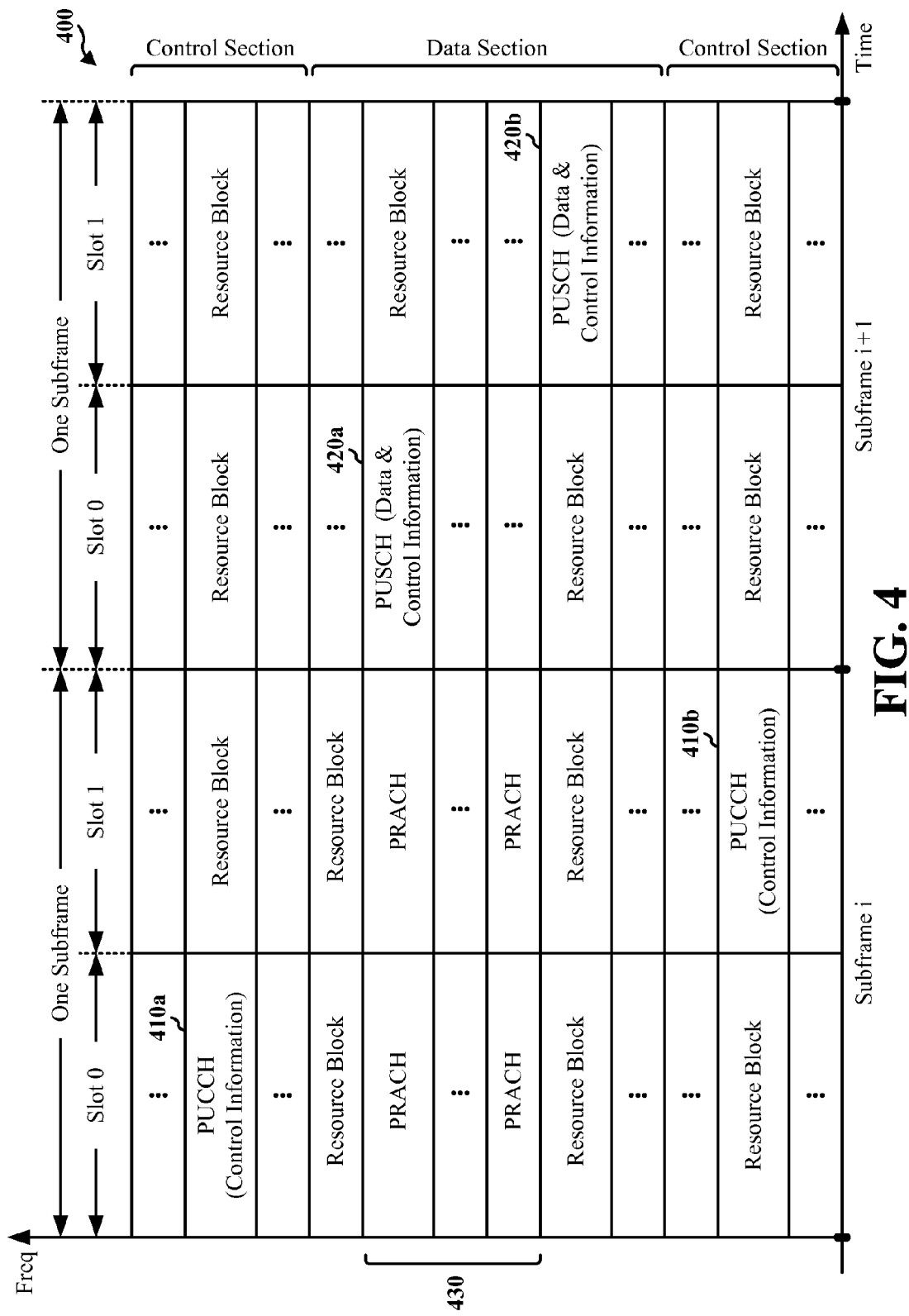
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
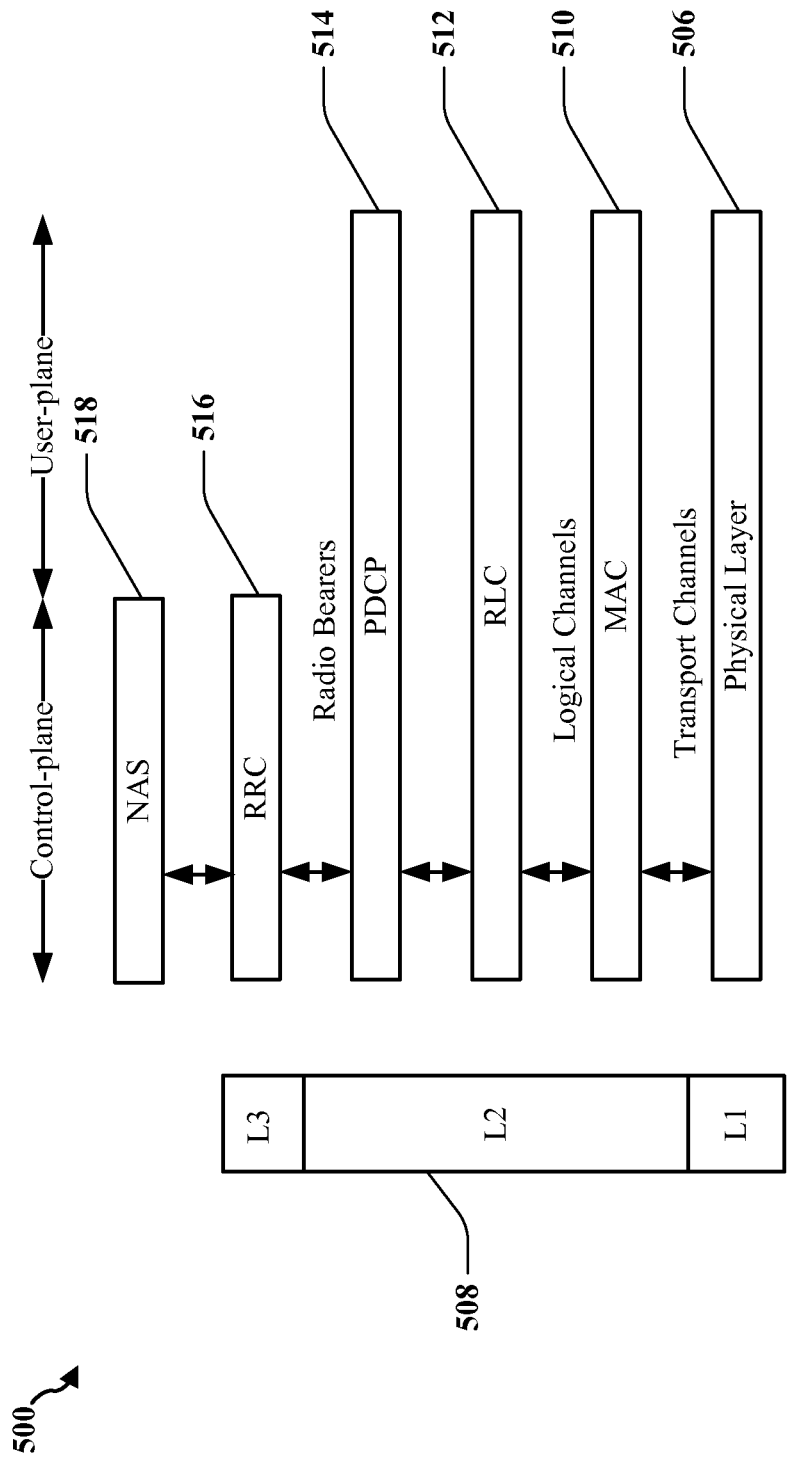
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE. The control plane includes a non-access stratum (NAS) layer 518. The NAS layer 518 is responsible for handling functionality between the UE and the EPC.

Figure 6:
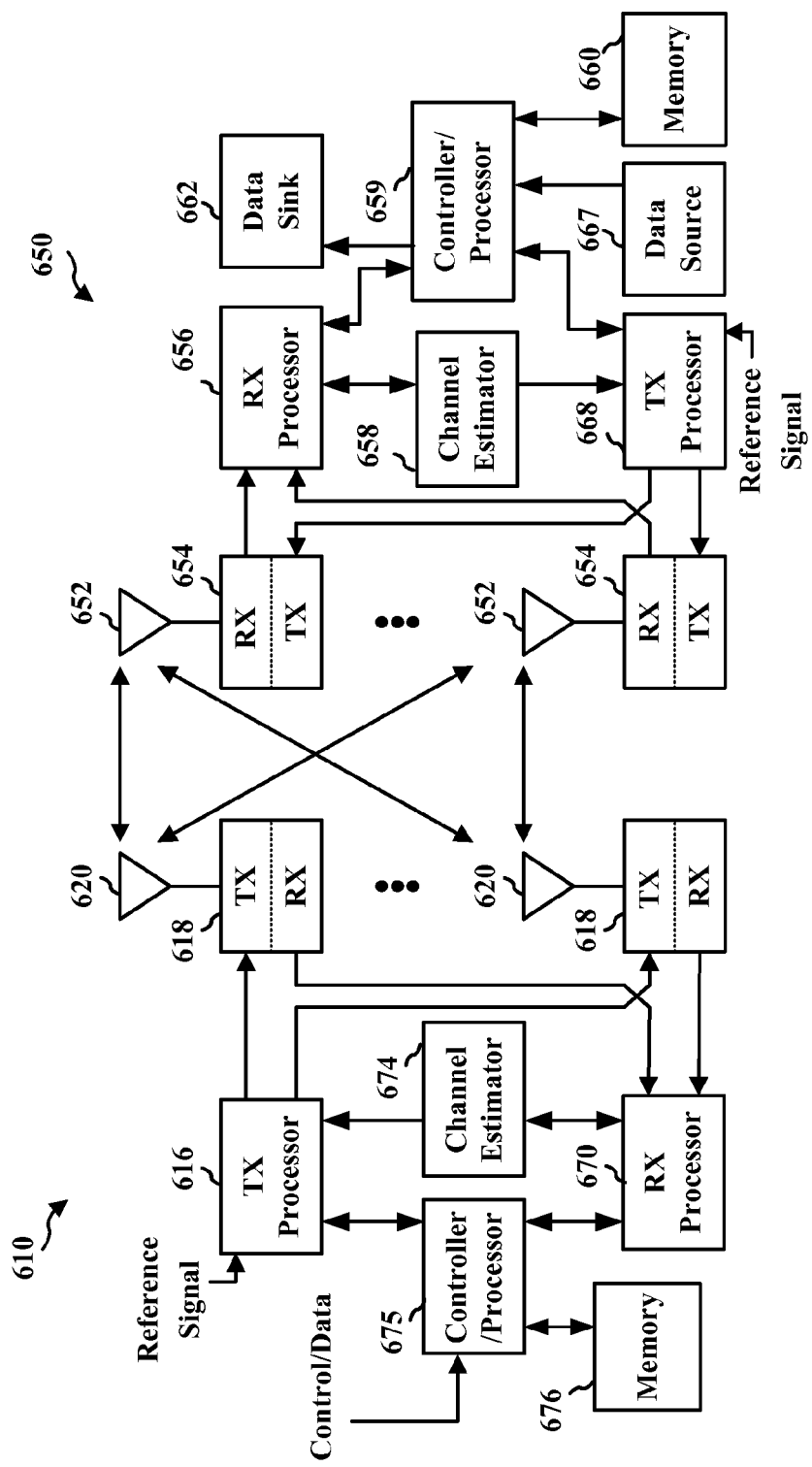
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

In the MAC layer, UEs may control an UL packet flow based on thermal factors such as system overheating or on a reduced capacity of the central processing unit (CPU) (small number of additional available instructions per second (IPS)). When MAC UL packet flow is triggered, the UE may stop the transmission of data packets for a cool down time period (e.g., ~30-130 ms) in order to reduce the system temperature and/or to reduce a CPU load. A UE stops the flow of UL data packets in the cool down time period by advertising a small/fake buffer size (e.g., zero) in a buffer status report (BSR) in order to achieve a lower desirable data rate. If the UE receives any UL grants during the cool down time period, the UE sends a BSR zero and pads the remainder of the grant. The UE does not send any application data on the UL during the cool down time period.

LTE supports voice over LTE (VoLTE)/voice over Internet Protocol (VoIP) and voice telephony (VT). Voice/video (transmitted through the real-time transport protocol (RTP)) and data traffic (transmitted through the file transfer protocol (FTP)/user datagram protocol (UDP)) may be transmitted concurrently in UL. UL flow control is implemented in the MAC layer and the MAC layer is agnostic to the nature/type of data/traffic that a bearer carries. As such, UL flow control is applied to all data packets, including RTP data packets (real-time data including voice and/or video) and FTP/UDP data packets (non-real-time data). Because the cool down time period during which the UE does not transmit application data may be around 100 ms, the quality of service (QoS)

requirements for conversation voice/video traffic will not be met. Accordingly, methods are needed for excluding real-time data traffic from the MAC UL packet flow control.

Figure 7:
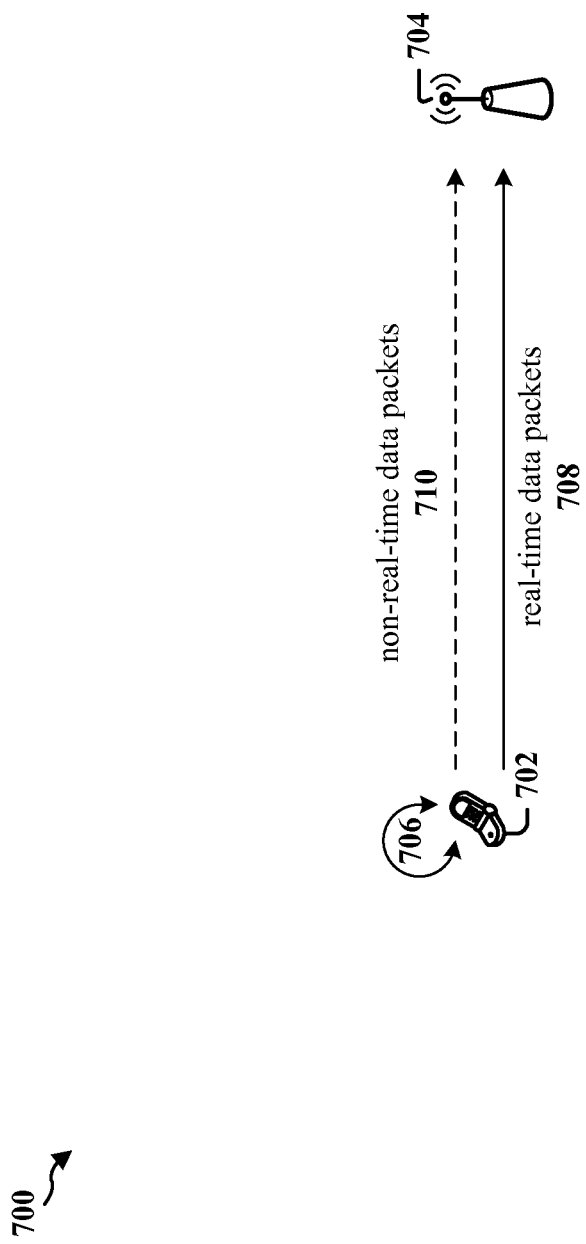
FIG. 7 is a diagram for illustrating an exemplary method.

FIG. 7 is a diagram 700 for illustrating an exemplary method. As shown in FIG. 7, a UE 702 may transmit data packets 708/710 to an eNB 704. The data packets may include real-time data packets 708 that carry voice and/or video. The real-time data packets 708 may also be referred to as guaranteed bit rate traffic or RTP data packets, as the voice/video may be transmitted through RTP. The data packets may include non-real-time data packets 710 that carry data with a lower required bit rate (e.g., a bit rate lower than that required for voice/video). The non-real-time data packets 710 may be referred to as FTP data packets or UDP data packets, as the non-real-time data packets 710 may be transmitted through FTP and/or UDP. High system temperature, low available CPU IPS, and/or other triggering mechanisms may trigger UL flow control 706 in the UE 702 in order to reduce a transmission rate of the data packets 708/710 for a cool down time period. The UE 702 determines whether the data packets 708/710 include or potentially include real-time data packets 708. If the data packets 708/710 include or potentially include real-time data packets 708, the UE 702 refrains from implementing the UL flow control to reduce (e.g., stop) the transmission rate of the known or potential real-time data packets 708. However, for the non-real-time data packets 710, the UE 702 may implement UL flow control to reduce (e.g., stop) the transmission rate of the non-real-time data packets for the cool down time period.

In a first configuration, the UE 702 may determine whether the data packets 708/710 potentially include real-time data packets 708 based on a scheduling request (SR) mask bit receiving through RRC signaling. The UE 702 may receive an SR mask bit through RRC signaling. When the SR mask bit is set/configured (e.g., set to 1), the UE 702 is expected to stop sending SR requests to obtain UL grants for traffic on a VoLTE bearer. The UE 702 instead will use semi-persistently scheduled grants for the VoLTE traffic. The UE 702 may check whether the SR mask bit is set/configured and determine that the data packets 708/710 potentially include real-time data packets 708 when the SR mask bit is set/configured.

In a second configuration, the UE 702 may determine whether the data packets 708/710 potentially include real-time data packets 708 based on a received configuration for semi-persistent scheduling. The UE 702 may receive a configuration for semi-persistent scheduling. In the configuration for semi-persistent scheduling, the UE 702 may receive an indication of an interval at which radio resources are periodically assigned. The UE 702 may compare the interval to a threshold, and if the interval is less than a threshold, determine that the data packets 708/710 potentially include real-time data packets 708. For example, the UE 702 may receive an indication of an interval of 20 ms for which radio resources are periodically assigned. The UE 702 may compare the interval to a threshold, such as 25 ms, to determine that the data packets 708/710 likely include real-time data packets 708, and therefore potentially include real-time data packets 708. However, if the UE 702 receives an indication of an interval of 100 ms for periodically assigned resources, the UE 702 may determine that the data packets 708/710 are unlikely to include real-time data packets 708, and therefore do not potentially include real-time data packets 708.

In a third configuration, the UE 702 may determine whether the data packets 708/710 include real-time data packets 708 based on QoS Class Identifier (QCI) information obtained from the NAS layer. Conversational voice/video are sent on QCI 1 and QCI 2. The UE 702 may determine one or more QCIs associated with the data packets 708/710. When the one or more QCIs include a QCI equal to 1 or 2, the UE 702 may determine that the data packets 708/710 include real-time data packets 708. Currently, QCI 1 and QCI 2 are used only for voice and video, respectively. However, if QCI 1 and QCI 2 are used for other types of data, then the UE 702 may only be able to determine that the data packets 708/710 potentially include real-time data packets 708.

In a fourth configuration, the UE 702 may determine whether the data packets 708/710 potentially include real-time data packets 708 based on whether the RLC layer is in an unacknowledged mode (UM). The RLC layer may be configured in one of three data transmission modes: transparent mode (TM), UM, and acknowledged mode (AM). In UM, the data packets transmitted by the UE 702 and received by the eNB 704 are not acknowledged by the eNB 704 and retransmissions are not supported. UM is used for delay-sensitive services when error-free delivery is not required, such as with voice/video. When the RLC layer is configured with UM, the UE 702 determines that the data packets 708/710 potentially include real-time data packets 708.

In a fifth configuration, the UE 702 may determine whether the data packets 708/710 include real-time data packets 708 based on a robust header compression (ROHC) profile identifier. The UE 702 may compress headers of the data packets 708/710 based on ROHC for RTP, IP, UDP, and FTP traffic. The ROCH profile identifier for RTP traffic is 1. When the profile identifier of the ROCH is equal to 1, the UE 702 may determine that the data packets 708/710 include real-time data packets 708. Currently, an ROHC profile identifier equal to 1 is only used for RTP traffic. However, if an ROHC profile identifier equal to 1 is used for other network protocols, then the UE 702 may only be able to determine that the data packets 708/710 potentially include real-time data packets 708.

In a sixth configuration, the UE 702 may determine whether the data packets 708/710 include or potentially include real-time data packets 708 based on one or more of the first through fifth configurations discussed supra. Based on one or more of the first through fifth configurations, the UE 702 may determine whether the data packets 708/710 likely include real-time data packets 708. When the data packets 708/710 include known or potential real-time data packets 708 or are likely to include real-time data packets 708, the UE 702 excludes the VoLTE/VT bearer (or RTP bearer) from applying UL flow control to those known, likely, or potential real-time data packets 708. The methods provided supra differentiate bearers that have a minimum guaranteed bit rate and exclude those bearers from any MAC UL flow control that could impair the QoS.

Figure 8:
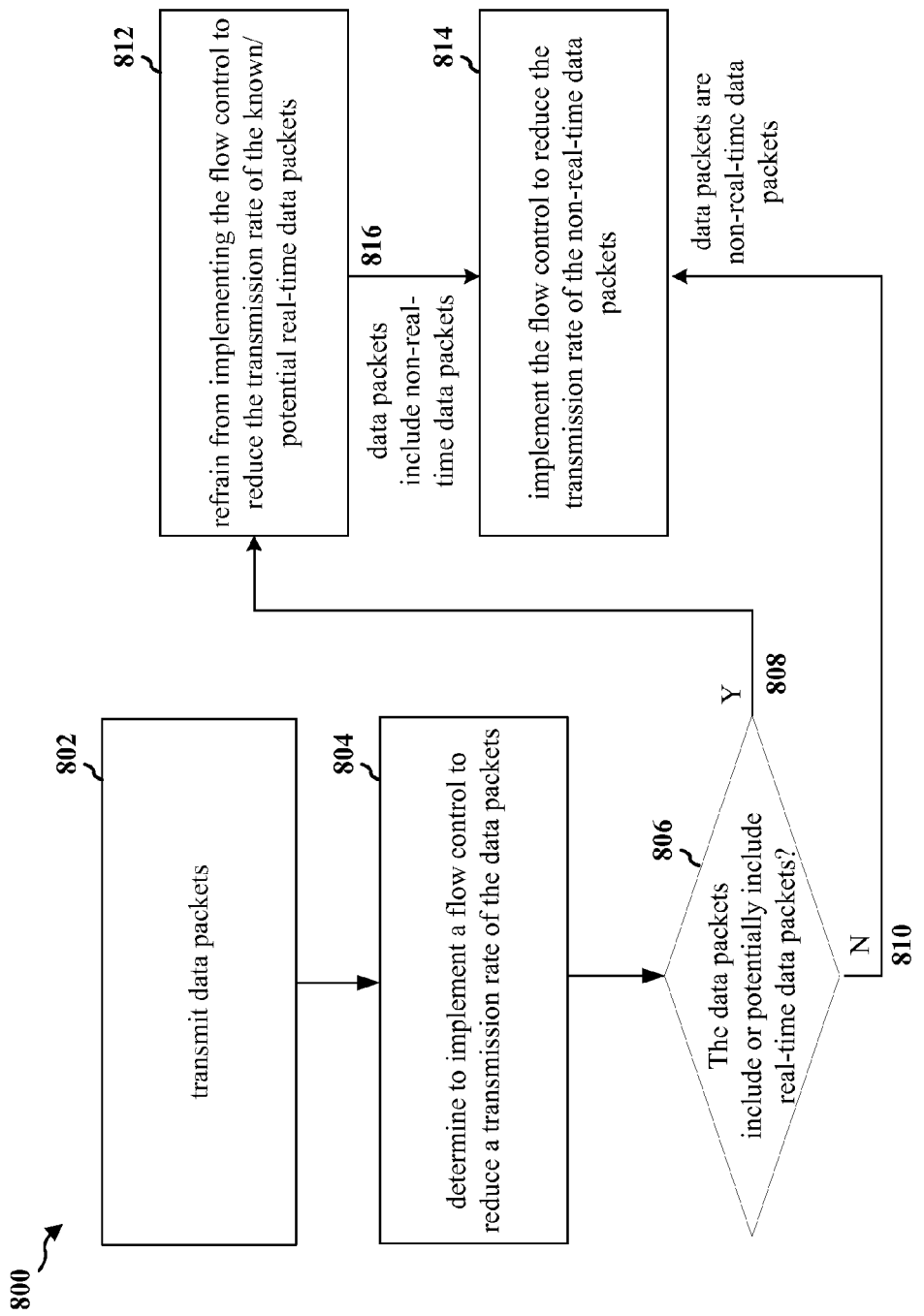
FIG. 8 is a first flow chart of a method of wireless communication.

FIG. 8 is a first flow chart 800 of a method of wireless communication. The method may be performed by a UE, such as by the UE 702. In step 802, the UE transmits data packets. In step 804, the UE determines to implement a flow control to reduce a transmission rate of the data packets. As discussed supra, there may be multiple triggers for the flow control, such as system overheating or reduced additional capacity of the CPU. In step 806, the UE determines whether the data packets include or potentially include real-time data packets. When the UE determines that the data packets include or potentially include real-time data packets (808), in step 812, the UE refrains from implementing the flow control to reduce the transmission rate of the known or potential real-time data packets. When the data packets include non-real-time data packets, in step 814, the UE may implement the flow control to reduce the transmission rate of non-real-time data packets. Step 814 may be performed without performing step 812 if the UE determines that the data packets do not include known/potential real-time data packets and are therefore all non-real-time data packets (810). Step 814 may be performed concurrently with step 812 (816) if the UE determines that the data packets include non-real-time data packets and known/potential real-time data packets. As discussed supra, the real-time data packets may be RTP packets for transmission through RTP. The RTP packets may include voice and/or video. The non-real-time data packets may include FTP packets for transmission through FTP and/or UDP packets for transmission through UDP.

Figure 9:
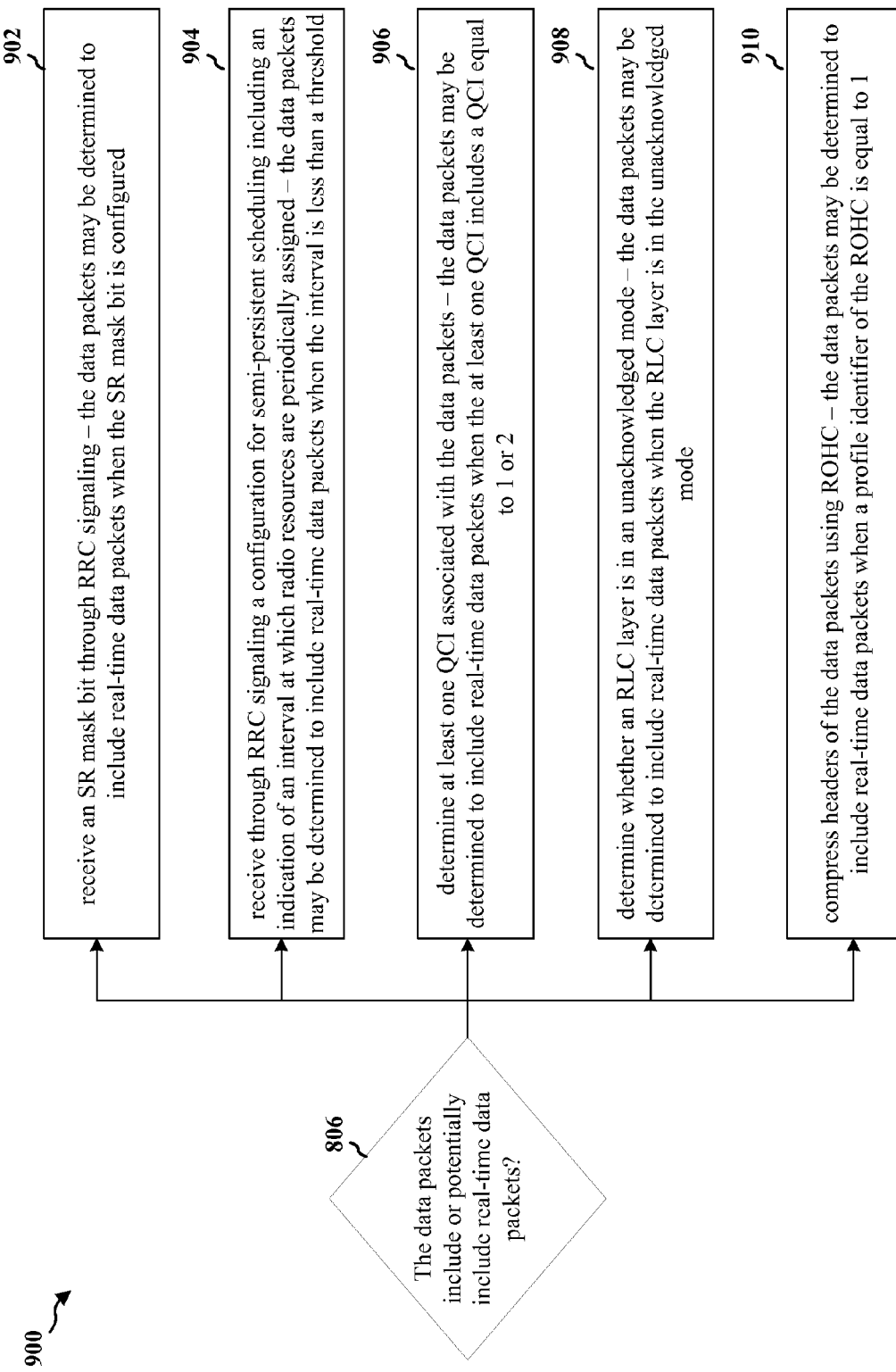
FIG. 9 is a second flow chart of a method of wireless communication.

FIG. 9 is a second flow chart 900 of a method of wireless communication. The method may be performed by a UE, such as the UE 702. As discussed supra, in step 806, the UE determines whether the data packets include or potentially include real-time data packets. That is, the UE determines whether the data packets include known or potential real-time data packets. In step 902, the UE may receive an SR mask bit through RRC signaling. The UE may determine that the data packets include known/potential real-time data packets when the SR mask bit is configured (e.g., set to 1). In step 904, the UE may receive through RRC signaling a configuration for semi-persistent scheduling including an indication of an interval at which radio resources are periodically assigned. The UE may determine that the data packets include known/potential real-time data packets when the interval is less than a threshold. In step 906, the UE may determine at least one QCI associated with the data packets. The UE may determine that the data packets include known/potential real-time data packets when the at least one QCI includes a QCI equal to 1 or 2. In step 908, the UE may determine whether an RLC layer is in an UM. The UE may determine that the data packets include known/potential real-time data packets when the RLC layer is in the UM. In step 910, the UE may compress headers of the data packets using ROHC. The UE may determine that the data packets include known/potential real-time data packets when a profile identifier of the ROHC is equal to 1. To perform step 806, the UE may perform one or more of the steps 902-910.

Figure 10:
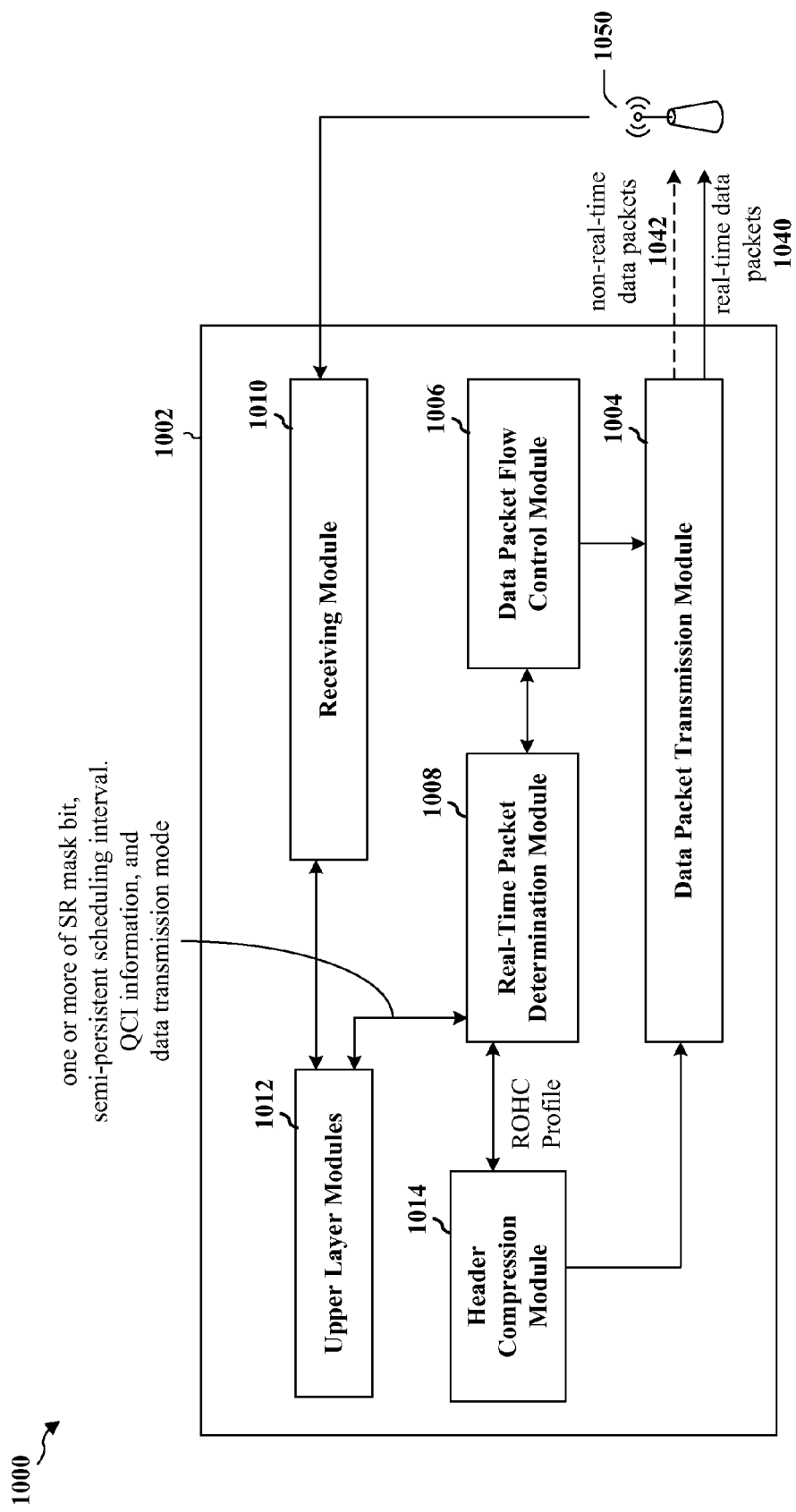
FIG. 10 is a conceptual data flow diagram illustrating the data flow between different modules/means/components in an exemplary apparatus.

FIG. 10 is a conceptual data flow diagram 1000 illustrating the data flow between different modules/means/components in an exemplary apparatus 1002. The apparatus may be a UE. The apparatus includes a data packet transmission module 1004 that transmits data packets to an eNB 1050. The transmitted data packets may include non-real-time data packets 1042 and/or real-time data packets 1040. The apparatus further includes a data packet flow control module 1006 that determines to implement a flow control to reduce (or to stop) a transmission rate of the data packets. The data packet flow control module 1006 interfaces with the data packet transmission module 1004 to reduce/stop the data packet transmissions. The apparatus further includes a real-time packet determination module 1008 that determines whether the data packets include known or potential real-time data packets. When the real-time packet determination module 1008 determines that the data packets include known/potential real-time data packets, the data packet flow control module 1006 interfaces with the data packet transmission module 1004 to refrain from implementing the flow control to reduce the transmission rate of the known/potential real-time data packets. When the data packets include non-real-time data packets, the data packet flow control module 1006 may interface with the data packet transmission module 1004 to implement the flow control to reduce the transmission rate of non-real-time data packets.

The apparatus may further include a receiving module 1010 that is configured to receive information from the eNB 1050. The information may be provided to upper layer modules 1012. The real-time packet determination module 1008 may communicate with the upper layer modules 1012 to obtain information needed for determining whether the data packets include known/potential real-time data packets. The receiving module 1010 may receive an SR mask bit through RRC signaling and provide the SR mask bit to the upper layer modules 1012. The real-time packet determination module 1008 may obtain the SR mask bit from the upper layer modules 1012 and determine that the data packets include known/potential real-time data packets when the SR mask bit is configured. The receiving module 1010 may receive through RRC signaling a configuration for semi-persistent scheduling including an indication of an interval at which radio resources are periodically assigned. The receiving module 1010 may provide the configuration information to the upper layer modules 1012. The real-time packet determination module 1008 may obtain the semi-persistent scheduling interval and determine that the data packets include known/potential real-time data packets when the interval is less than a threshold. The upper layer modules 1012 may determine at least one QCI associated with the data packets. The real-time packet determination module 1008 may obtain the QCI information from the upper layer modules 1012 and determine that the data packets include known/potential real-time data packets when the at least one QCI includes a QCI equal to 1 or 2. The upper layer modules 1012 may determine whether an RLC layer is in an UM. The real-time packet determination module 1008 may obtain the data transmission mode from the upper layer modules 1012 and determine that the data packet include known/potential real-time data packets when the RLC layer is in the UM. The apparatus may further include a header compression module 1014 that compresses headers of the data packets using ROHC. The real-time packet determination module 1008 may obtain ROHC profile information from the header compression module 1014 and determine that the packets include known/potential real-time data packets when a profile identifier of the ROHC is equal to 1.

The apparatus may include additional modules that perform each of the steps of the algorithm in the aforementioned flow charts of FIGS. 8, 9. As such, each step in the aforementioned flow charts of FIGS. 8, 9 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 11:
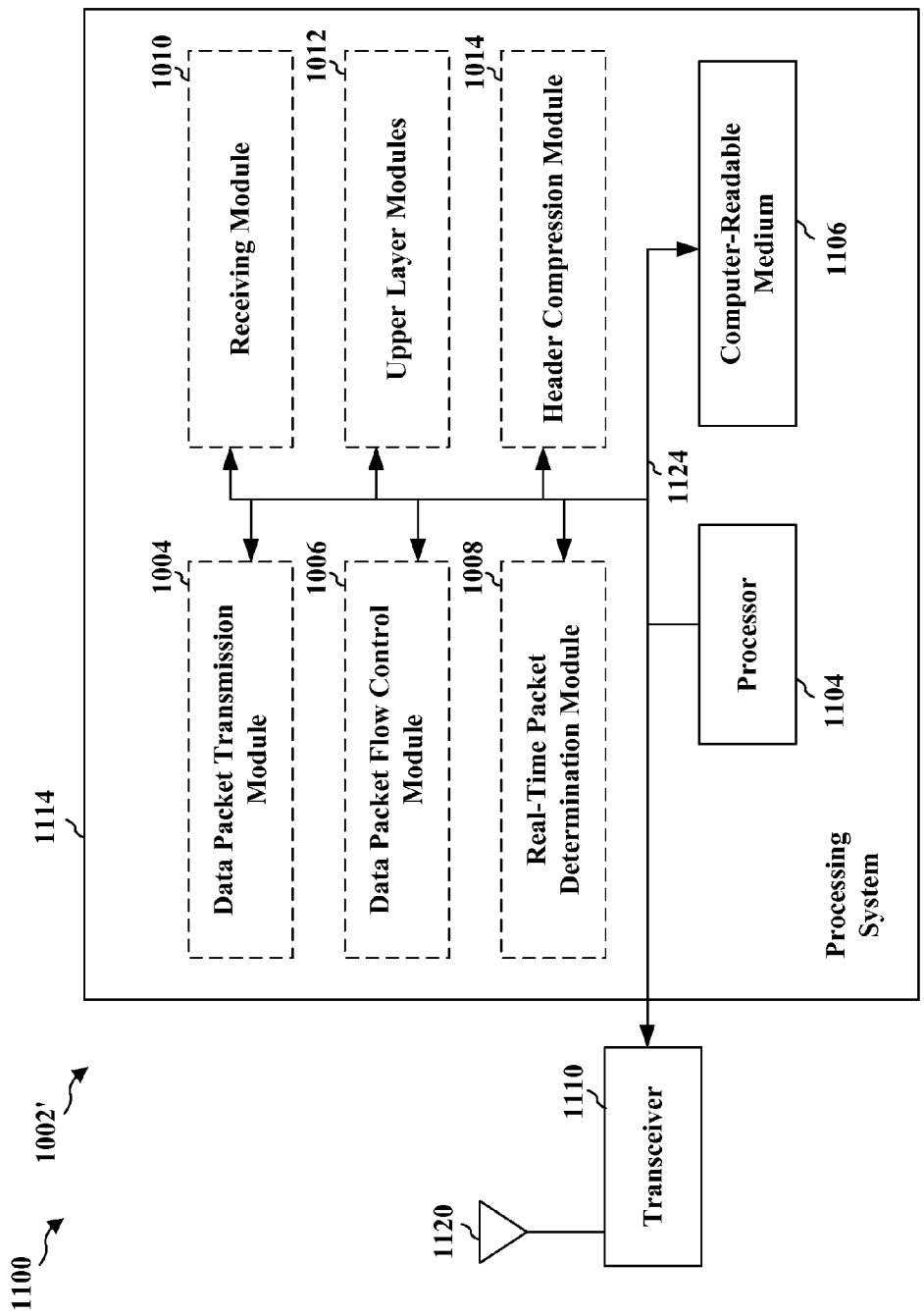
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware modules, represented by the processor 1104, the modules 1004, 1006, 1008, 1010, 1012, 1014, and the computer-readable medium 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The processing system 1114 includes a processor 1104 coupled to a computer-readable medium 1106. The processor 1104 is responsible for general processing, including the execution of software stored on the computer-readable medium 1106. The software, when executed by the processor 1104, causes the processing system 1114 to perform the various functions described supra for any particular apparatus. The computer-readable medium 1106 may also be used for storing data that is manipulated by the processor 1104 when executing software. The processing system further includes at least one of the modules 1004, 1006, 1008, 1010, 1012, and 1014. The modules may be software modules running in the processor 1104, resident/stored in the computer readable medium 1106, one or more hardware modules coupled to the processor 1104, or some combination thereof. The processing system 1114 may be a component of the UE 650 and may include the memory 660 and/or at least one of the TX processor 668, the RX processor 656, and the controller/processor 659.

In one configuration, the apparatus 1002/1002' for wireless communication includes means for transmitting data packets, means for determining to implement a flow control to reduce a transmission rate of the data packets, means for determining whether the data packets include known or potential real-time data packets, and means for refraining from implementing the flow control to reduce the transmission rate of the known/potential real-time data packets when the data packets include known/potential real-time data packets. The apparatus may further include means for receiving an SR mask bit through RRC signaling. The data packets may be determined to include known/potential real-time data packets when the SR mask bit is configured. The apparatus may further include means for receiving through RRC signaling a configuration for semi-persistent scheduling including an indication of an interval at which radio resources are periodically assigned. The data packets may be determined to include known/potential real-time data packets when the interval is less than a threshold. The apparatus may further include means for determining at least one QCI associated with the data packets. The data packets may be determined to include known/potential real-time data packets when the at least one QCI includes a QCI equal to 1 or 2. The apparatus may further include means for determining whether an RLC layer is in an UM. The data packets may be determined to include known/potential real-time data packets when the RLC layer is in the UM. The apparatus may further include means for compressing headers of the data packets using ROHC. The data packets may be determined to include known/potential real-time data packets when a profile identifier of the ROHC is equal to 1. The known/potential real-time data packets may be RTP packets for transmission through RTP. The RTP packets may include at least one of voice or video. The apparatus may further include means for implementing the flow control to reduce the transmission rate of non-real-time data packets of the data packets. The non-real-time data packets may include at least one of FTP packets for transmission through FTP and UDP packets for transmission through UDP.

The aforementioned means may be one or more of the aforementioned modules of the apparatus 1002 and/or the processing system 1114 of the apparatus 1002' configured to perform the functions recited by the aforementioned means. As described supra, the processing system 1114 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication of a user equipment (UE), comprising:
    transmitting data packets;
    determining to implement a flow control to reduce a transmission rate of the data packets based at least on a capacity of a processor associated with the UE;
    receiving through radio resource (RRC) signaling a configuration for semi-persistent scheduling including an indication of an interval at which radio resources are periodically assigned;
    determining whether the data packets include non-real time data packets or known/potential real-time data packets based at least on a comparison of the interval with a threshold time value; and
    refraining from implementing the flow control to reduce the transmission rate of the known/potential real-time data packets when the data packets include known/potential real-time data packets,
    wherein the data packets are determined to include known/potential real-time data packets when the interval is less than the threshold time value.

2. The method of claim 1, further comprising implementing the flow control to reduce the transmission rate of the non-real-time data packets of the data packets.

3. The method of claim 2, wherein the non-real-time data packets include at least one of file transfer protocol (FTP) packets for transmission through FTP and user datagram protocol (UDP) packets for transmission through UDP.

4. The method of claim 2, wherein implementing the flow control comprises advertising a small buffer size in a buffer status report, wherein the small buffer size is configured to reduce the transmission rate of the non-real-time data packets.

5. The method of claim 1, further comprising receiving a scheduling request (SR) mask bit through radio resource control (RRC) signaling, wherein the data packets are determined to include known/potential real-time data packets when the SR mask bit is configured.

6. The method of claim 1, further comprising determining at least one quality of service (QoS) class identifier (QCI) associated with the data packets, wherein the data packets are determined to include known/potential real-time data packets when the at least one QCI includes a QCI equal to 1 or 2.

7. The method of claim 1, further comprising determining whether a radio link control (RLC) layer is in an unacknowledged mode, wherein the data packets are determined to include known/potential real-time data packets when the RLC layer is in the unacknowledged mode.

8. The method of claim 1, further comprising compressing headers of the data packets using robust header compression (ROHC), wherein the data packets are determined to include known/potential real-time data packets when a profile identifier of the ROHC is equal to 1.

9. The method of claim 1, wherein the known/potential real-time data packets comprise real-time transport protocol (RTP) packets for transmission through RTP.

10. The method of claim 1, wherein determining to implement the flow control to reduce the transmission rate of the data packets is further based on thermal factors associated with the UE.

11. A user equipment (UE) apparatus for wireless communication, comprising:
means for transmitting data packets;
means for determining to implement a flow control to reduce a transmission rate of the data packets based at least on a capacity of a processor associated with the UE apparatus;
means for receiving through radio resource control (RRC) signaling a configuration for semi-persistent scheduling including an indication of an interval at which radio resources are periodically assigned;
means for determining whether the data packets include non-real-time data packets or known/potential real-time data packets based at least on a comparison of the interval with a threshold time value; and
means for refraining from implementing the flow control to reduce the transmission rate of the known/potential real-time data packets when the data packets include known/potential real-time data packets,
wherein the data packets are determined to include known/potential real-time data packets when the interval is less than the threshold time value.

12. The apparatus of claim 11, further comprising means for implementing the flow control to reduce the transmission rate of the non-real-time data packets of the data packets.

13. The apparatus of claim 12, wherein the non-real-time data packets include at least one of file transfer protocol (FTP) packets for transmission through FTP and user datagram protocol (UDP) packets for transmission through UDP.

14. The apparatus of claim 11, further comprising means for receiving a scheduling request (SR) mask bit through radio resource control (RRC) signaling, wherein the data packets are determined to include known/potential real-time data packets when the SR mask bit is configured.

15. The apparatus of claim 11, further comprising means for determining at least one quality of service (QoS) class identifier (QCI) associated with the data packets, wherein the data packets are determined to include known/potential real-time data packets when the at least one QCI includes a QCI equal to 1 or 2.

16. The apparatus of claim 11, further comprising means for determining whether a radio link control (RLC) layer is in an unacknowledged mode, wherein the data packets are determined to include known/potential real-time data packets when the RLC layer is in the unacknowledged mode.

17. The apparatus of claim 11, further comprising means for compressing headers of the data packets using robust header compression (ROHC), wherein the data packets are determined to include known/potential real-time data packets when a profile identifier of the ROHC is equal to 1.

18. The apparatus of claim 11, wherein the known/potential real-time data packets comprise real-time transport protocol (RTP) packets for transmission through RTP.

19. The apparatus of claim 11, wherein the means for determining is further for determining to implement the flow control to reduce the transmission rate of the data packets based on thermal factors associated with the UE apparatus.

20. A user equipment (UE) apparatus for wireless communication, comprising:
a processing system configured to:
transmit data packets;
determine to implement a flow control to reduce a transmission rate of the data packets based at least on a capacity of a processor associated with the UE apparatus;
receive through radio resource control (RRC) signaling a configuration for semi-persistent scheduling including an indication of an interval at which radio resources are periodically assigned;
determine whether the data packets include non-real-time data packets or known/potential real-time data packets based at least on a comparison of the interval with a threshold time value; and
refrain from implementing the flow control to reduce the transmission rate of the known/potential real-time data packets when the data packets include known/potential real-time data packets,
wherein the data packets are determined to include known/potential real-time data packets when the interval is less than the threshold time value.

21. The apparatus of claim 20, wherein the processing system is configured to implement the flow control to reduce the transmission rate of the non-real-time data packets of the data packets.

22. The apparatus of claim 21, wherein the non-real-time data packets include at least one of file transfer protocol (FTP) packets for transmission through FTP and user datagram protocol (UDP) packets for transmission through UDP.

23. The apparatus of claim 20, wherein the processing system is configured to receive a scheduling request (SR) mask bit through radio resource control (RRC) signaling, wherein the data packets are determined to include known/potential real-time data packets when the SR mask bit is configured.

24. The apparatus of claim 20, wherein the processing system is configured to determine at least one quality of service (QoS) class identifier (QCI) associated with the data packets, wherein the data packets are determined to include known/potential real-time data packets when the at least one QCI includes a QCI equal to 1 or 2.

25. The apparatus of claim 20, wherein the processing system is configured to determine whether a radio link control (RLC) layer is in an unacknowledged mode, wherein the data packets are determined to include known/potential real-time data packets when the RLC layer is in the unacknowledged mode.

26. The apparatus of claim 20, wherein the processing system is configured to compress headers of the data packets using robust header compression (ROHC), wherein the data packets are determined to include known/potential real-time data packets when a profile identifier of the ROHC is equal to 1.

27. The apparatus of claim 20, wherein the known/potential real-time data packets comprise real-time transport protocol (RTP) packets for transmission through RTP.

28. The apparatus of claim 20, wherein determining to implement the flow control to reduce the transmission rate of the data packets is further based on thermal factors associated with the UE apparatus.

29. A non-transitory computer-readable medium in a user equipment (UE) comprising code that when executed on at least one processor causes the at least one processor to:
transmit data packets;
determine to implement a flow control to reduce a transmission rate of the data packets based at least on a capacity of a processor associated with the UE apparatus;
receive through radio resource control (RRC) signaling a configuration for semi-persistent scheduling including an indication of an interval at which radio resources are periodically assigned;
determine whether the data packets include non-real-time data packets or known/potential real-time data packets based at least on a comparison of the interval with a threshold time value; and
refrain from implementing the flow control to reduce the transmission rate of the known/potential real-time data packets when the data packets include known/potential real-time data packets,
wherein the data packets are determined to include known/potential real-time data packets when the interval is less than the threshold time value.

30. The non-transitory computer-readable medium of claim 29, wherein the code that when executed on at least one processor further causes the at least one processor to implement the flow control to reduce the transmission rate of the non-real-time data packets of the data packets.

31. The non-transitory computer-readable medium of claim 30, wherein the non-real-time data packets include at least one of file transfer protocol (FTP) packets for transmission through FTP and user datagram protocol (UDP) packets for transmission through UDP.

32. The non-transitory computer-readable medium of claim 29, wherein the code that when executed on at least one processor further causes the at least one processor to receive a scheduling request (SR) mask bit through radio resource control (RRC) signaling, wherein the data packets are determined to include known/potential real-time data packets when the SR mask bit is configured.

33. The non-transitory computer-readable medium of claim 29, wherein the code that when executed on the at least one processor further causes the at least one processor to determine at least one quality of service (QoS) class identifier (QCI) associated with the data packets, wherein the data packets are determined to include known/potential real-time data packets when the at least one QCI includes a QCI equal to 1 or 2.

34. The non-transitory computer-readable medium of claim 29, further comprising code for determining whether a radio link control (RLC) layer is in an unacknowledged mode, wherein the data packets are determined to include known/potential real-time data packets when the RLC layer is in the unacknowledged mode.

35. The non-transitory computer-readable medium of claim 29, wherein the code that when executed on the at least one processor further causes the at least one processor to compress headers of the data packets using robust header compression (ROHC), wherein the data packets are determined to include known/potential real-time data packets when a profile identifier of the ROHC is equal to 1.

36. The non-transitory computer-readable medium of claim 29, wherein the known/potential real-time data packets comprise real-time transport protocol (RTP) packets for transmission through RTP.

37. The computer program product of claim 29, wherein determining to implement the flow control to reduce the transmission rate of the data packets is further based on thermal factors associated with the UE.

\* \* \* \* \*